(12) United States Patent
Choi et al.

(10) Patent No.: US 11,689,262 B2
(45) Date of Patent: Jun. 27, 2023

(54) COMMUNICATION DEVICE FOR PERFORMING BEAMFORMING AND OPERATING METHOD THEREOF

(71) Applicant: Samsung Electronics Co., Ltd., Suwon-si (KR)

(72) Inventors: Yongin Choi, Seoul (KR); Yangsoo Kwon, Seoul (KR); Joonsung Kim, Hwaseong-si (KR); Jinwoo Oh, Seogwipo-si (KR); Mingoo Kim, Hwaseong-si (KR); Inhyoung Kim, Yongin-si (KR); Youngseok Jung, Suwon-si (KR); Jinwon Choi, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 17/539,769

(22) Filed: Dec. 1, 2021

(65) Prior Publication Data

US 2022/0182115 A1 Jun. 9, 2022

(30) Foreign Application Priority Data

Dec. 3, 2020 (KR) .................. 10-2020-0167664
Feb. 1, 2021 (KR) .................. 10-2021-0014399

(51) Int. Cl.
*H04B 7/02* (2018.01)
*H04B 7/06* (2006.01)

(52) U.S. Cl.
CPC ......... *H04B 7/0615* (2013.01); *H04B 7/0639* (2013.01); *H04B 7/0695* (2013.01)

(58) Field of Classification Search
CPC ............... H04B 7/0615; H04B 7/0639; H04B 7/0695; H04B 7/0452; H04B 7/0691;
(Continued)

(56) References Cited

U.S. PATENT DOCUMENTS 8,654,888 B2    2/2014  Kawahara et al.
10,374,859 B2   8/2019  Kim et al.
(Continued)

FOREIGN PATENT DOCUMENTS

CN       108199793        *  6/2018
WO    WO-2017/050930 A1      3/2017

OTHER PUBLICATIONS

Amadori, P.V. and C. Masouros. "Low RF-Complexity Millimeter-Wave Beamspace-MIMO Systems by Beam Selection." *IEEE Transactions on Communications* 63.6 (2015): 2212-2223.
(Continued)

*Primary Examiner* — Helene E Tayong
(74) *Attorney, Agent, or Firm* — Harness, Dickey & Pierce, P.L.C.

(57) ABSTRACT

An operating method of a communication device for providing a beamformed transmission signal to a plurality of terminals may include determining a target transmission vector based on an area restriction condition for each of the plurality of terminals, generating a beam selection matrix for selecting some of a plurality of antennas based on the target transmission vector and a beam selection condition, generating a precoding matrix based on the target transmission vector and the beam selection matrix, and generating a transmission signal based on the beam selection matrix and the precoding matrix.

19 Claims, 11 Drawing Sheets

(58) Field of Classification Search
CPC .............. H04B 7/0456; H04L 25/021; H04L 25/03343; H04L 25/03891
USPC ........................................................ 375/267
See application file for complete search history.

(56) References Cited

U.S. PATENT DOCUMENTS

| | | | |
|---|---|---|---|
| 10,491,245 | B2 | 11/2019 | Qian et al. |
| 10,721,015 | B2 | 7/2020 | Ryden et al. |
| 10,771,131 | B2 | 9/2020 | Zhou et al. |
| 2008/0232489 | A1 | 9/2008 | Tsai et al. |
| 2012/0269284 | A1 | 10/2012 | Jen et al. |
| 2014/0106774 | A1* | 4/2014 | Siomina ............... H04W 64/00 455/456.1 |
| 2020/0186310 | A1 | 6/2020 | Yang et al. |
| 2020/0322009 | A1 | 10/2020 | Upadhya et al. |
| 2020/0322044 | A1 | 10/2020 | Knopp et al. |

OTHER PUBLICATIONS

Gao, X. et al. "Near-Optimal Beam Selection for Beamspace MmWave Massive MIMO Systems." *IEEE Communications Letters* 20.5 (2016): 1054-1057.

You, L. et al. "BDMA for Millimeter-Wave/Terahertz Massive MIMO Transmission with Per-Beam Synchronization." *IEEE Journal on Selected Areas in Communications* (2017): 1-29.

Masouros, C. and E. Alsusa. "Dynamic Linear Precoding for the Exploitation of Known Interference in MIMO Broadcast Systems." *IEEE Transactions on Wireless Communications* 8:3 (2009): 1396-1404.

Choi, Y. et al. "Constructive Interference Optimization for Data-Aided Precoding in Multi-User MISO Systems." *IEEE Transactions on Wireless Communications* 18:2 (2019): 1128-1141.

Bolte, J. et al. "Proximal Alternating Linearized Minimization for Nonconvex and Nonsmooth Problems." *Math. Program.* 146:1-2 (2014): 459-494.

Teng, Y. et al. "Penalty PALM Method for Sparse Portfolio Selection Problems." *Optim. Methods Softw.* 32:1 (2017): 126-147.

Lee, S.R. et al. "Zero-Forcing Beamforming in Multiuser MISO Downlink Systems Under Per-Antenna Power Constraint and Equal-Rate Metric." *IEEE Transactions on Wireless Communications* 12:1 (2013): 228-236.

Extended European Search Report dated May 19, 2022 for corresponding EP Patent Application No. 21208950.2.

Domouchtsidis, S. et al: "Antenna Selection Symbol-Level Precoding for Low Complexity Large-Scale Antenna Array Systems" *IEEE* (2018).

Lee J. et al: "Constructive Interference Optimization for Hybrid Beamforming with Data-aided Symbol-level Precoding in Multi-user MISO System" *IEEE* (2019): 510-513.

* cited by examiner

COMMUNICATION DEVICE FOR PERFORMING BEAMFORMING AND OPERATING METHOD THEREOF

CROSS-REFERENCE TO RELATED APPLICATIONS

This application is based on and claims priority under 35 U.S.C. § 119 to Korean Patent Application Nos. 10-2020-0167664 and 10-2021-0014399, respectively filed on Dec. 3, 2020 and Feb. 1, 2021, in the Korean Intellectual Property Office, the disclosures of which are incorporated by reference herein in their entirety.

BACKGROUND

The inventive concepts relate to a communication device for performing beamforming and an operating method thereof.

A communication device including a plurality of antennas may perform a beamforming operation to transmit a transmission signal to a plurality of terminals. Beamforming may refer to a method of transmitting directional signals through a plurality of antennas. For example, a base station may transmit a downlink signal to a terminal device performing wireless communication via a beamforming method. Considering channel reciprocity between an uplink and a downlink between the base station and the terminal, the base station may transmit a beamforming-based downlink signal to the terminal based on a downlink estimated based on an uplink signal received from the terminal. However, interference may occur in a transmission signal transmitted to a target terminal by a transmission signal to be transmitted to another terminal, and when a transmission signal is generated via a phase shift keying (PSK) method, a phase of the transmission signal may be distorted by the interference.

SUMMARY

At least one problem to be solved by at least one technical idea of the inventive concepts is to provide a communication device that increases the strength of a transmission signal by generating interference caused by a transmission component corresponding to another terminal among transmission signals as constructive interference to a target terminal.

According to an aspect of the inventive concepts, there is provided an operating method of a communication device for providing a beamformed transmission signal to a plurality of terminals, the operating method including determining a target transmission vector based on an area restriction condition for each of the plurality of terminals, generating a beam selection matrix for selecting some of a plurality of antennas based on the target transmission vector and a beam selection condition, generating a precoding matrix based on the target transmission vector and the beam selection matrix, and generating a transmission signal based on the beam selection matrix and the precoding matrix.

According to another aspect of the inventive concepts, there is provided an operating method of a communication device for providing a beamformed transmission signal to a plurality of terminals, the operating method including generating a precoding signal by precoding transmission data corresponding to each of the plurality of terminals based on a precoding matrix, and based on a beam selection matrix for selecting some antennas from among a plurality of the antennas, generating a transmission signal corresponding to each of the some antennas, and a transmission signal corresponding to each target terminal has a strength amplified by an interference vector corresponding to another terminal in a transmission signal component.

According to another aspect of the inventive concepts, there is provided a communication device including a plurality of antennas each configured to output a beamformed transmission signal to a plurality of terminals, a radio frequency (RF) chain arranged in a number less than a number of the plurality of antennas, and a processor configured to determine a beam selection matrix and a precoding matrix based on an area restriction condition and a beam selection condition for each of the plurality of terminals, and a transmission signal generated by the beam selection matrix and the precoding matrix has a strength amplified by an interference vector corresponding to another terminal.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Hereinafter, example embodiments of the inventive concepts will be described in detail by referring to the attached drawings.

Figure 1:
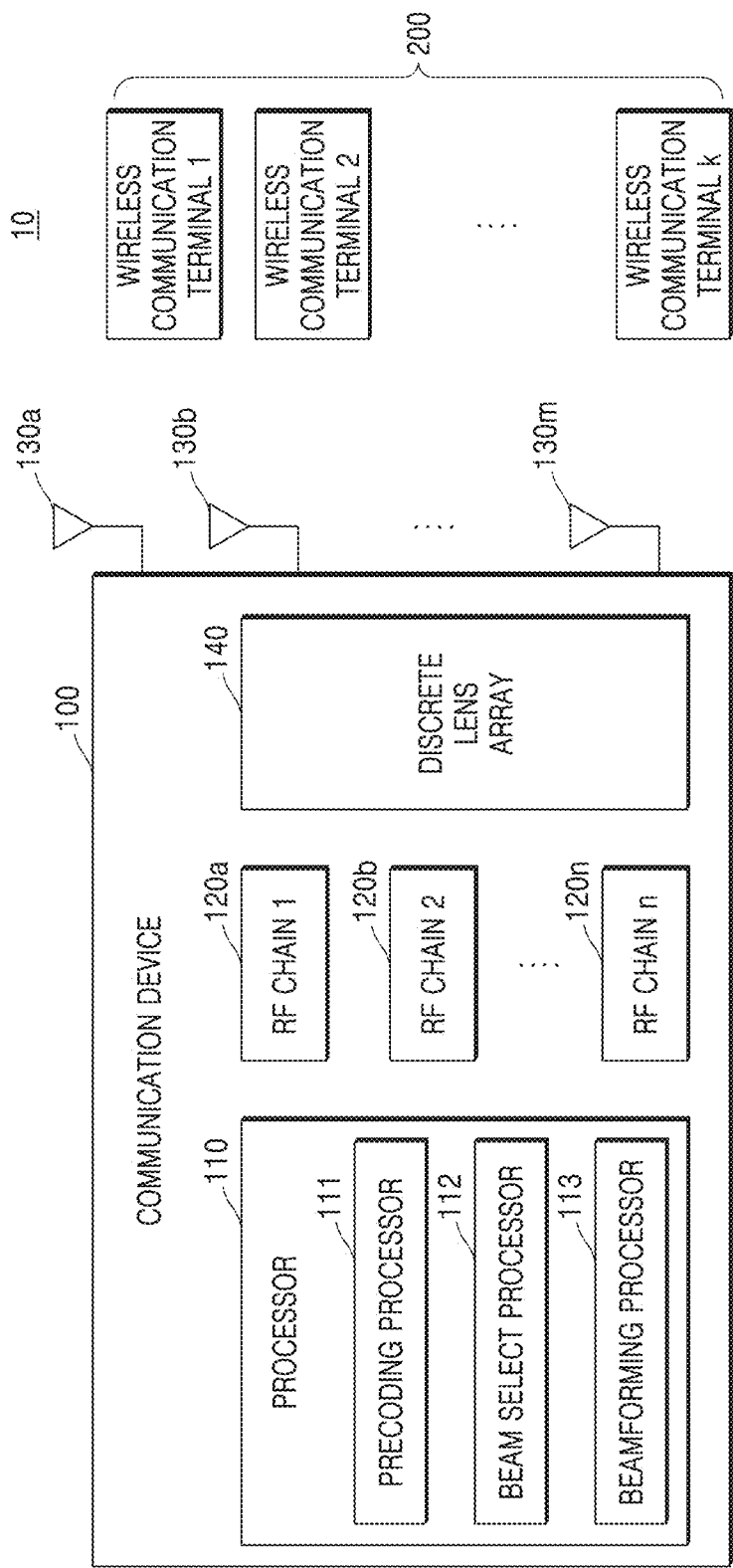
FIG. 1 is a block diagram of a communication system according to example embodiments of the inventive concepts.

FIG. 1 is a block diagram of a communication system according to example embodiments of the inventive concepts.

A wireless communication system 10 may refer to an arbitrary system including a communication device 100 and a wireless communication terminal 200. For example, the wireless communication system 10 may be one of a new radio (NR) system, a 5th generation (5G) wireless system, a long term evolution (LTE) system, an LTE-advanced system, a code division multiple access (CDMA) system, a global system for mobile communication (GSM), a wireless local area network (WLAN) system, and the like. Also, the CDMA system may be implemented in various CDMA versions such as wideband CDMA (WCDMA), time division synchronization CDMA (TD-SCDMA), CDMA2000, etc. Hereinafter, the wireless communication system 10 will be described with reference mainly to a 5G system or an LTE system, but it will be understood that example embodiments of the inventive concepts are not limited thereto.

A wireless communication network of the wireless communication system 10 may support a plurality of users to communicate by sharing available network resources. For example, in the wireless communication network, information may be transmitted via various multiple access methods such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, OFDM-CDMA, and the like.

In some example embodiments, the wireless communication system 10 may include a communication device, and the communication device may be a base station (BS). The BS may generally refer to a fixed station communicating with a user equipment (UE) and/or another BS, and may exchange data and control information through communication with a UE and/or another cell. For example, the BS may be referred to as a cell, a Node B, an evolved-Node B (eNB), a next generation node B (gNB), a sector, a site, a base transceiver system (BTS), an access point (AP), a relay node, a remote radio head (RRH), a radio unit (RU), a small cell, and the like. In the present specification, the BS may be interpreted in a comprehensive meaning indicating some areas or functions covered by a base station controller (BSC) in CDMA, a Node-B in WCDMA, an eNB in LTE, a gNB or sector (site) in NR, and the like, and may cover all of various coverage areas such as megacell, macrocell, microcell, picocell, femtocell, relay node, RRH, RU, and small cell communication ranges.

In some example embodiments, the wireless communication terminal 200 may be a UE in the wireless communication system 10. The UE may refer to various devices which may be fixed or mobile and are capable of transmitting and receiving data and/or control data through communication with the BS. For example, the UE may be referred to as a terminal equipment, a mobile station (MS), a mobile terminal (MT), a user terminal (UT), a subscriber station (SS), a wireless device, a handheld device, and the like.

Referring to FIG. 1, the wireless communication system 10 may include the communication device 100 and a plurality of wireless communication terminals 200. However, this is only an example and is not limited thereto. The wireless communication system 10 may include a plurality of cells and a plurality of network entities. The communication device 100 may transmit and receive data signals or control information through communication with the wireless communication terminal 200 or a communication device of another cell.

The communication device 100 may include a processor 110, a plurality of RF chain circuits 120a to 120n, a discrete lens array (DLA) 140, and/or a plurality of antennas 130a to 130m. The processor 110 may include a precoding processor 111, a beam selection processor 112, and/or a beamforming processor 113, and may generate data corresponding to each terminal as a transmission signal based on a matrix corresponding to each of the precoding processor 111, the beam selection processor 112, and/or the beamforming processor 113. For example, the precoding processor 111 may transform data into a precoding signal based on a precoding matrix. Generation of each signal by the processor 110 will be described at a later time with reference to FIGS. 8 and 9.

In addition, the processor 110 may generate a precoding matrix, a beam selection matrix, and a beamforming matrix based on information about each wireless communication terminal 200. For example, the processor 110 may obtain channel information about each terminal and generate a precoding matrix and a beam selection matrix based on the channel information, an area restriction condition, and a beam selection condition. Generation of matrices by the processor 110 will be described at a later time with reference to FIGS. 3 to 7.

The RF chain circuits 120a to 120n are circuits configured to amplify or denoise a signal generated by the processor 110 and may include, for example, a bandpass filter, a low noise amplifier, and a frequency down-converter. According to example embodiments of the inventive concepts, the precoding signal includes a combination of precoding signal vectors corresponding to the number of RF chain circuits 120a to 120n, and the RF chain circuits 120a to 120n may be configured to amplify and output each of the precoding signal vectors.

In addition, the number of RF chain circuits 120a to 120n may be less than the number of antennas 130a to 130m. When the number of RF chain circuits 120a to 120n is less than the number of antennas 130a to 130m, the communication device 100 may select an antenna corresponding to the number of RF chain circuits 120a to 120n based on the beam selection matrix and transmit a signal to the DLA 140 through the corresponding antenna.

The DLA 140 may generate a beamforming signal by refracting signals output from the antennas 130a to 130m. A degree of refraction of a signal through the DLA 140 may vary according to a location of each of the antennas 130a to 130m, and accordingly, the communication device 100 may beamform a transmission signal to a location of the wireless communication terminal 200.

Each wireless communication terminal 200 may receive a signal transmitted from the communication device 100 through at least one antenna, and the wireless communication terminal 200 according to the inventive concepts receives a signal through one antenna so that the communication system 10 may be a system in which communication is performed via a multi user-multi input single output (MU-MISO) method, but is not limited thereto. The communication system 10 may also be a system in which communication is performed via a multi user-multi input multi output (MU-MIMO) method.

Figure 2:
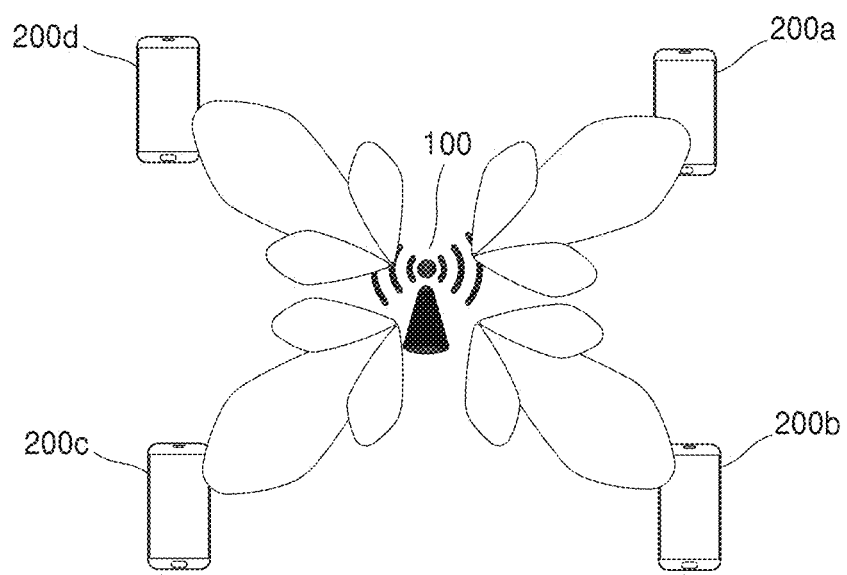
FIG. 2 is a diagram of an example in which a communication device provides a transmission signal to a plurality of terminals by performing a beamforming operation, according to example embodiments of the inventive concepts.

FIG. 2 is a diagram of an example in which the communication device 100 provides a transmission signal to a plurality of terminals by performing a beamforming operation, according to example embodiments of the inventive concepts.

Referring to FIG. 2, transmission signals may be beamformed toward a plurality of wireless communication terminals 200a to 200d and provided to the wireless communication terminals 200a to 200d, respectively. In some example embodiments, in the transmission signals corresponding to the wireless communication terminals 200a to 200d, respectively, interference may occur due to a transmission component corresponding to other wireless communication terminals among the transmission signals, and this may be referred to as inter-user interference.

The communication system 10 may overcome a channel propagation loss caused by millimeter (mm)-waves through a DLA having a lower RF chain and lower complexity, and thus a higher spectral gain may be obtained. For example, when communication is performed via the MU-MISO method, the system capacity may be improved by advantageously utilizing the degree of spatial freedom provided by multiple beams. That is, the wireless communication terminals 200a to 200d may be scheduled to simultaneously share the transmission signal. In some example embodiments, the performance of the communication system 10 may be improved as much as the number of orthogonal beams, and it may be important that as many orthogonal beams are selected as possible. However, as the number of wireless communication terminals 200a to 200d increases, the number of orthogonal beams may rapidly decrease due to inter-user interference.

In the communication device 100 according to inventive concepts, the transmission signal may be designed so that inter-user interference for each of the wireless communication terminals 200a to 200d is constructively interfered. For example, the communication device 100 may further move a transmission signal generated based on inter-user interference in a PSK modulation process to a restricted area corresponding to each of the wireless communication terminals 200a to 200d. In some example embodiments, the restricted area corresponding to each of the wireless communication terminals 200a to 200d may be obtained based on data in units of symbols and channel state information.

Figure 3:
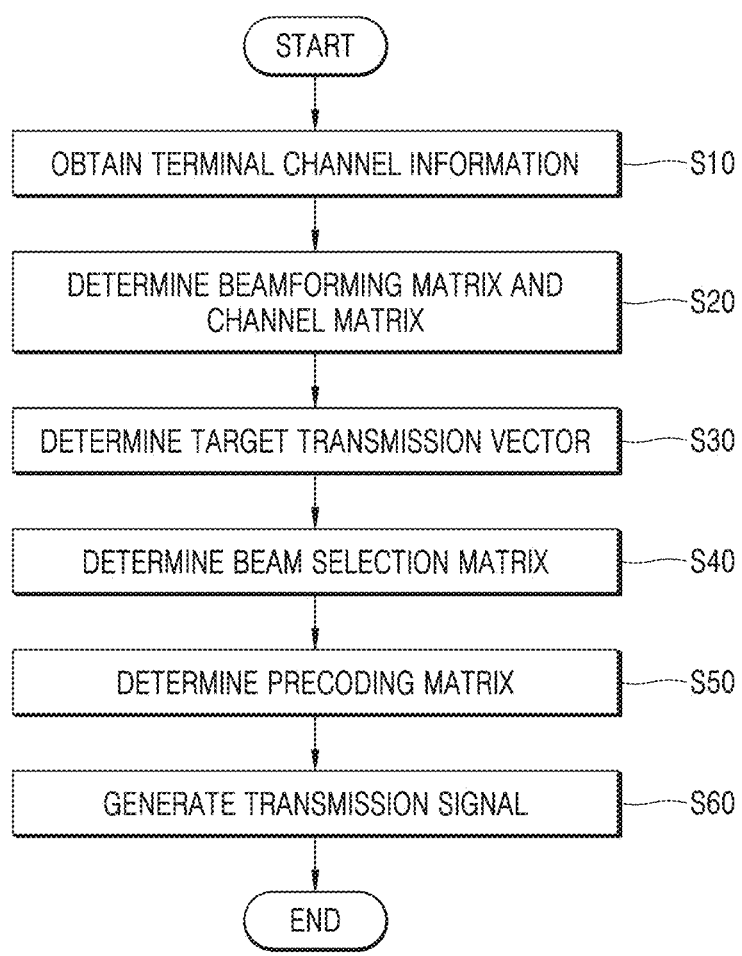
FIG. 3 is a diagram of a method of generating a transmission signal by a generated matrix, according to example embodiments of the inventive concepts.

FIG. 3 is a diagram of a method of generating a transmission signal by a generated matrix, according to example embodiments of the inventive concepts.

Referring to FIG. 3, the communication device 100 according to the inventive concepts may determine a target transmission vector satisfying an area restriction condition and a beam selection condition, and may determine a beam selection matrix and a precoding matrix based on the target transmission vector. The communication device 100 may generate data corresponding to each wireless communication terminal as a transmission signal based on a beamforming matrix, a channel matrix, the beam selection matrix, and/or the precoding matrix.

In operation S10, the communication device 100 may obtain terminal channel information about each wireless communication device. The terminal channel information may include the number of wireless communication devices for the communication device 100 to perform wireless communication and may include channel state information. The communication device 100 may obtain the channel state information as a signal-to-nose ratio (SNR) corresponding to each wireless communication device.

In operation S20, the communication device 100 may generate the channel matrix based on the terminal channel information obtained for each wireless communication device. In addition, the communication device 100 may generate a beamforming matrix corresponding to the DLA. For example, the communication device 100 may generate a matrix having rows and columns of Equation 1 below as a channel matrix and may generate a matrix having rows and columns of Equation 2 as a beamforming matrix.

$$H = [h_1, h_2, \ldots, h_K]^H \in \mathbb{C}^{K \times M} \quad \text{[Equation 1]}$$

$$U \in \mathbb{C}^{M \times M} \quad \text{[Equation 2]}$$

wherein K (K is a natural number) may be the number of wireless communication devices, and M (M is a natural number) may be the number of antennas of the communication device 100.

The communication device 100 may obtain a channel vector $h_k$ corresponding to each wireless communication device through Equation 3.

$$h_k = \sum_{l=1}^{L} \beta_{k,l} g(\vartheta_{k,l}) \quad \text{[Equation 3]}$$

In Equation 3, L is the number of multi-paths in $\vartheta_{k,l}$ of $-\pi/2$ to $\pi/2$, and $\beta_{k,l}$ may be a path gain of a k-th wireless communication device. A steering vector $g(\vartheta_{k,l})$ may be obtained through Equation 4 below.

$$g(\vartheta) = \frac{1}{\sqrt{M}} \left[ 1, e^{-j2\pi \frac{d}{\lambda} \sin \vartheta}, \ldots, e^{-j2\pi (M-1) \frac{d}{\lambda} \sin \vartheta} \right]^T \quad \text{[Equation 4]}$$

In Equation 4, d may be a distance between adjacent antennas, and λ may be a carrier wavelength.

The communication device 100 having obtained the channel vector $h_k$ corresponding to each wireless communication terminal may obtain a channel covariance matrix $R_k$ for each wireless communication terminal through Equation 5 below.

$$R_k \triangleq E\{h_k h_k^H\} \quad \text{[Equation 5]}$$

The communication device 100 may generate an eigenvalue of the channel covariance matrix $R_k$ through Equation 6 below.

$$R_k = V \Lambda_k V^H \quad \text{[Equation 6]}$$

wherein $\Lambda_k$ may be a diagonal matrix generated from the eigenvalue of the channel covariance matrix, and V may be a column corresponding to the eigenvalue of the channel covariance matrix.

Considering a uniform linear array (ULA) formed at a half-wavelength antenna spacing, V may be formed as a unitary discrete Fourier transform matrix $F_M$. In some example embodiments, an (n,m) element of the unitary discrete Fourier transform matrix may be expressed as in Equation 7 below for sufficiently large M. The communication device 100 may determine the unitary discrete Fourier transform matrix as a beamforming matrix.

$$[F_M]_{nm} = e^{-j2\pi nm/M}/\sqrt{M} \quad \text{[Equation 7]}$$

In operation S30, the communication device 100 may determine the target transmission vector based on the area restriction condition and the beam selection condition. According to example embodiments of the inventive concepts, the communication device 100 may determine a transmission vector based on the area restriction condition, determine a beam selection vector based on the beam selection condition, and obtain the target transmission vector by iteratively generating the transmission vector and the beam selection vector. Example embodiments in which the communication device 100 obtains the target transmission vector will be described at a later time with reference to FIGS. 4 to 7B.

In operation S40, the communication device 100 may determine a beam selection matrix based on a target beam selection vector generated by the target transmission vector. For example, the communication device 100 may determine any one of candidate beam selection vectors satisfying the beam selection condition as a target beam selection vector corresponding to each wireless communication device, and obtain target beam selection vectors corresponding to a plurality of wireless communication devices as the beam selection matrix.

In operation S50, the communication device 100 may determine a precoding matrix based on the target transmission vector and the beam selection matrix. For example, the precoding matrix may be obtained by multiplying the target transmission vector by an inverse matrix of the beam selection matrix by using the target transmission vector generated through a matrix multiplication operation of the beam selection matrix and the precoding matrix.

In operation S60, the communication device 100 may obtain data corresponding to each wireless communication device in units of symbols, and may generate a selection signal by performing a matrix multiplication operation of the precoding matrix and the beam selection matrix on the data in units of symbols. The generated selection signal may be generated as a transmission signal through the DLA and the channel matrix.

Figure 4:
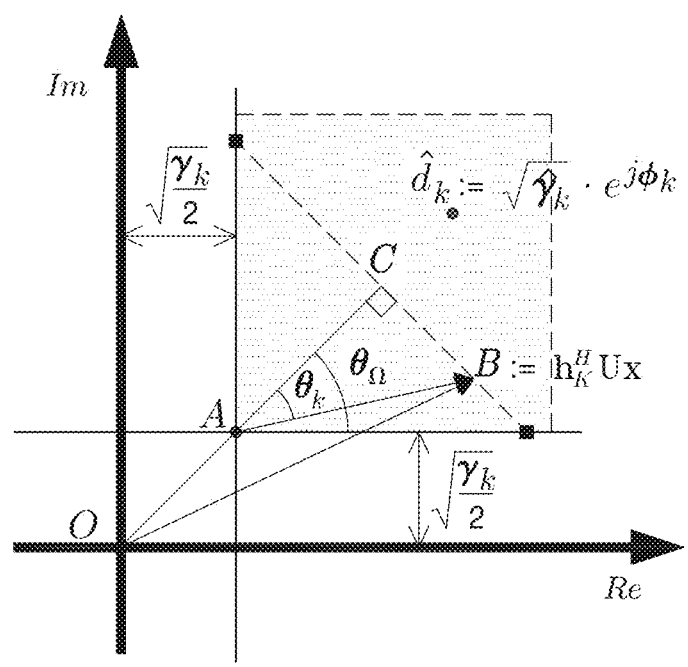
FIG. 4 is a diagram of an area restriction condition according to example embodiments of the inventive concepts.

FIG. 4 is a diagram of an area restriction condition according to example embodiments of the inventive concepts.

Referring to FIG. 4, in the communication device 100 according to the inventive concepts, a target wireless communication terminal may receive a transmission signal having an amplified strength due to constructive interference caused by other wireless communication terminals. Though the example embodiments according to FIG. 4 illustrates that the target wireless communication device receives a signal via a QPSK method for convenience of description, example embodiments of the inventive concepts are not limited thereto, and may include receiving a signal via all types of PSK and quadrature amplitude modulation (QAM) methods.

A constellation point of data for the target wireless communication device may be expressed by Equation 8 below.

$$d_k = e^{j\phi_k} \quad \text{[Equation 8]}$$

In some example embodiments, a boundary of an area restriction condition for the target wireless communication device may be defined by Equation 9 below.

$$\{\theta_k | \underline{\theta}_k \leq \theta_k \leq \overline{\theta}_k\} \quad \text{[Equation 9]}$$

wherein $\underline{\theta}_k = \phi_k - \theta_\Omega$, $\overline{\theta}_k = \phi_k + \theta_\Omega$, and $\theta_\Omega = \pi/\Omega$ may be satisfied. In order for the target wireless communication device to accurately decode data, a phase of a transmission signal may need to be located between $\underline{\theta}_k$ and $\overline{\theta}_k$. That is, a phase of a transmission signal including interference caused by other wireless communication terminals among transmission signals may need to be included within the boundary of the area restriction condition. That is, a phase of a transmission signal by a channel vector $\tilde{h}_k^H$ corresponding to the target wireless communication device in the channel matrix may need to be located between $\underline{\theta}_k$ and $\overline{\theta}_k$, and this may be expressed by Equation 10 below. k' may refer to other wireless communication devices excluding the target wireless communication device.

$$\underline{\theta}_k \leq \text{angle}(\tilde{h}_k^H S w_k d_k) \leq \overline{\theta}_k \quad \text{[Equation 10]}$$

The communication device 100 according to the inventive concepts may generate a transmission vector satisfying not only a phase condition of an interference component according to Equation 10, but also an area restriction condition for generating a transmission signal having a greater strength due to interference.

Referring to FIG. 4, a constellation point of the transmission signal for the target wireless communication terminal excluding the interference component is designated as A, as for the area restriction condition, not only the phase condition of Equation 10 may need to be satisfied, but a size of a constellation point B of the transmission signal including the interference component may also need to be greater than a size of the constellation point A. Accordingly, the constellation point of the transmission signal including the interference component may be expressed by Equation 11 below, and a vector condition of the constellation point satisfying the area restriction condition in some example embodiments may be expressed by Equation 11 below.

$$B := \tilde{h}_k^H x = h_k^H U x \quad \text{[Equation 11]}$$

$$\theta_k := \arctan\left(\frac{|\overrightarrow{BC}|}{|\overrightarrow{AC}|}\right) \leq \theta_\Omega$$

Referring to FIG. 4, to satisfy Equation 10, each constellation point vector may be expressed by Equation 12 to Equation 14 below.

$$|\overrightarrow{AB}| = |\overrightarrow{OB}| - |\overrightarrow{OA}| = (\tilde{h}_k^H x e^{-j\phi_k} - \sqrt{\gamma_k}) e^{j\phi_k} \quad \text{[Equation 12]}$$

$$|\overrightarrow{AC}| = \{\text{Re}(\tilde{h}_k^H x e^{-j\phi_k}) - \sqrt{\gamma_k}\} e^{j\phi_k} \quad \text{[Equation 13]}$$

$$|\overrightarrow{CB}| = j \, \text{Im}(\tilde{h}_k^H x e^{-j\phi_k}) e^{j\phi_k} \quad \text{[Equation 14]}$$

Referring to Equations 12 to 14, the area restriction condition in Equation 11 may expressed by Equation 15 below, and a boundary of an area parallel to an Re axis in FIG. 4 and a boundary of an area parallel to an Im axis may be respectively expressed as $c_1$ and $c_2$ in Equation 16.

$$|\text{Im}(\tilde{h}_k^H x e^{-j\phi_k})| \{\text{Re}(\tilde{h}_k^H x e^{-j\phi_k}) - \gamma_k\} \tan \theta_\Omega \quad \text{[Equation 15]}$$

$$f_{i,k}(x) = \sqrt{\gamma_k} \tan \theta_\Omega - \text{Re}(c_i \tilde{h}_k^H x^* e^{-j\phi_k}) \quad \text{[Equation 16]}$$

$$c_1 = \tan \theta_\Omega + j, c_2 = \tan \theta_\Omega - j$$

Accordingly, the area restriction condition for the target wireless communication device may be expressed by Equation 17 below with reference to Equation 16.

$$\chi_k := \{x | f_{1,k}(x) \leq 0 \text{ and } f_{2,k}(x) \leq 0\} \quad \text{[Equation 17]}$$

The communication device 100 according to the inventive concepts may obtain a channel matrix and a beamforming matrix by the method described above in FIG. 3, and may obtain a transmission vector satisfying the area restriction condition according Equation 16 based on the channel vector corresponding to the target wireless communication device in the channel matrix. Hereinafter, a method in which the communication device 100 generates a beam selection matrix and a precoding matrix by obtaining a transmission vector will be described with reference to FIGS. 5 to 8.

Figure 5:
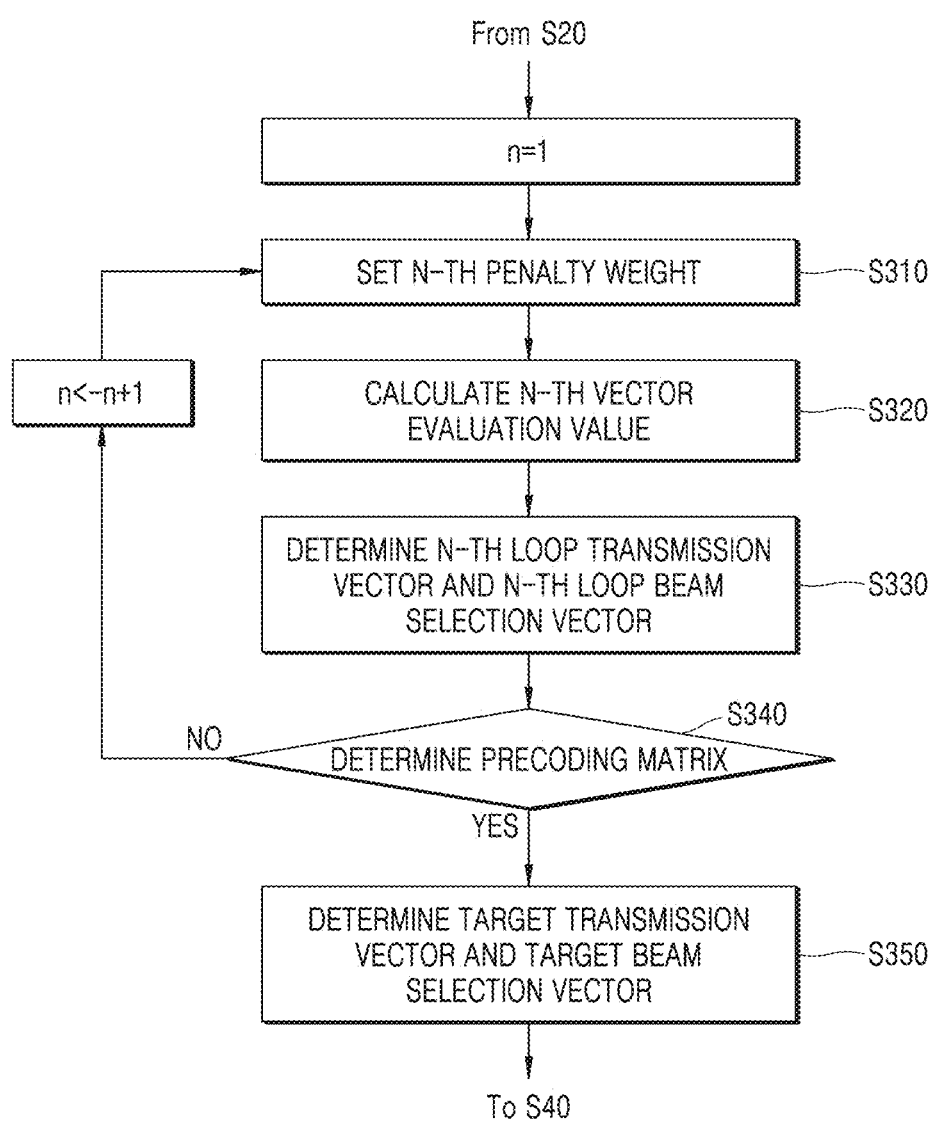
FIG. 5 is a flowchart of a method of determining a target transmission vector and a target beam selection vector according to an area restriction condition, according to example embodiments of the inventive concepts.

FIG. 5 is a flowchart of a method of determining a target transmission vector and a target beam selection vector according to an area restriction condition, according to example embodiments of the inventive concepts.

Referring to FIG. 5, the communication device 100 may set a penalty weight and continuously update a transmission vector and a beam selection vector according to the set penalty weight so that when the number of updates reaches a certain number of times or more, the target transmission vector and the target beam selection vector may be determined.

Referring to FIG. 4, the target transmission vector to be obtained by the communication device 100 may be a transmission vector having a minimum difference with respect to a target constellation point in an area corresponding to the target wireless communication device. The communication device 100 may determine a transmission vector satisfying Equation 18 below as a target transmission vector for all wireless communication devices, and in some example embodiments, $\hat{d}$ may be a target constellation point for all wireless communication devices.

$$\min_{x} E\left\{\left\|\hat{d} - (\tilde{H}x + n)\right\|^2\right\} \quad \text{[Equation 18]}$$

Because a minimization function of Equation 18 is not convex and not smooth, a minimum mean square error (MMSE) method for solving Equation 18 may be a difficult solution. Accordingly, the communication device 100 according to the inventive concepts may determine a target transmission vector and a target beam selection vector that satisfy Equation 19 below.

$$\min_{x,y}\left\{x^H \tilde{H}^H \tilde{H}x - 2\text{Re}(\hat{\eta}^T \phi^H \tilde{H}x) + \rho\|x - y\|^2\right\} \quad \text{[Equation 19]}$$

wherein x may be any one of candidate transmission vectors satisfying the area restriction condition according to FIG. 4, y may be any one of candidate beam selection vectors satisfying the beam selection condition, and ρ may be a penalty weight. In addition, $\hat{\eta}$ may be a size of the target constellation point, and ϕ may be a diagonal matrix regarding a phase of the target constellation point.

A minimization problem according to Equation 19 may be expressed by Equation 20 below, and $q_\rho$ (x, y) may be an objective function of Equation 19.

$$\min_{x,y} \Psi_\rho(x, y) = I_x(x) + q_\rho(x, y) + I_y(y) \quad \text{[Equation 20]}$$

$$\left(q_\rho(x, y) = x^H \tilde{H}^H \tilde{H}x - 2\text{Re}(\hat{\eta}^T \phi^H \tilde{H}x) + \rho\|x - y\|^2\right)$$

The communication device 100 according to the inventive concepts may iteratively set the penalty weight in Equations 19 and 20, and may determine the target transmission vector and the target beam selection vector by updating a loop transmission vector and a loop beam selection vector for each number of iterations.

Referring to FIG. 5, the communication device 100 having obtained the channel matrix and the beamforming matrix may set the penalty weight of Equation 19 in operation S310. According to example embodiments of the inventive concepts, the communication device 100 may set a higher penalty weight as the number of iterations increases. Accordingly, a weight given to a difference between a transmission vector and a beam selection vector in the objective function of Equation 19 may be set to be higher.

In operation S320, the communication device 100 may calculate a vector evaluation value based on the set penalty weight. The vector evaluation value may be a partial differential value for the penalty weight of Equation 20, and the transmission vector and the beam selection vector in some example embodiments may be the transmission vector and the beam selection vector determined through the example embodiments of FIG. 6.

In operation S330, the communication device 100 may determine a loop transmission vector and a loop beam selection vector by comparing the vector evaluation value with a target value. The communication device 100 may update the loop transmission vector and the loop beam selection vector based on a newly set penalty weight from the previously determined loop transmission vector and the loop beam selection vector. Determination of the loop transmission vector and the loop beam selection vector by the communication device 100 of inventive concepts will be described in detail with reference to FIG. 6.

Figure 7A:
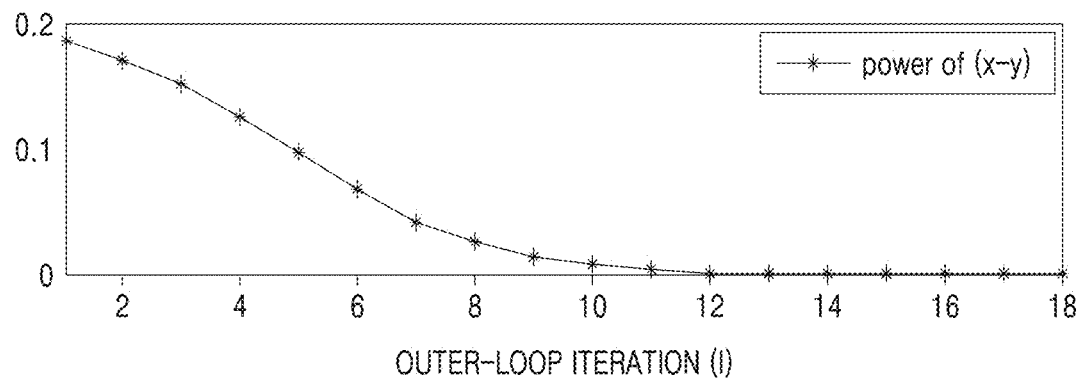
FIG. 7A is a graph of a difference between a loop transmission vector and a loop beam selection vector generated according to FIG. 5 with respect to the number of iterations.

In operation S340, when the loop transmission vector and the loop beam selection vector are updated by performing a predetermined or alternatively, desired number of iterations or more, the communication device 100 may determine the loop transmission vector and the loop beam selection vector as the target transmission vector and the target beam selection vector in operation S350, respectively. Referring to FIG. 7A, the communication device 100 may update the loop transmission vector and the loop beam selection vector so that the difference between the transmission vector and the beam selection vector is reduced by increasing the number of iterations.

The communication device 100 having determined a target transmission vector and a target beam selection vector corresponding to each wireless communication terminal may generate a beam selection matrix based on target beam selection vectors for a plurality of wireless communication terminals and may determine a precoding matrix based on the target transmission vector and the beam selection matrix.

Figure 6:
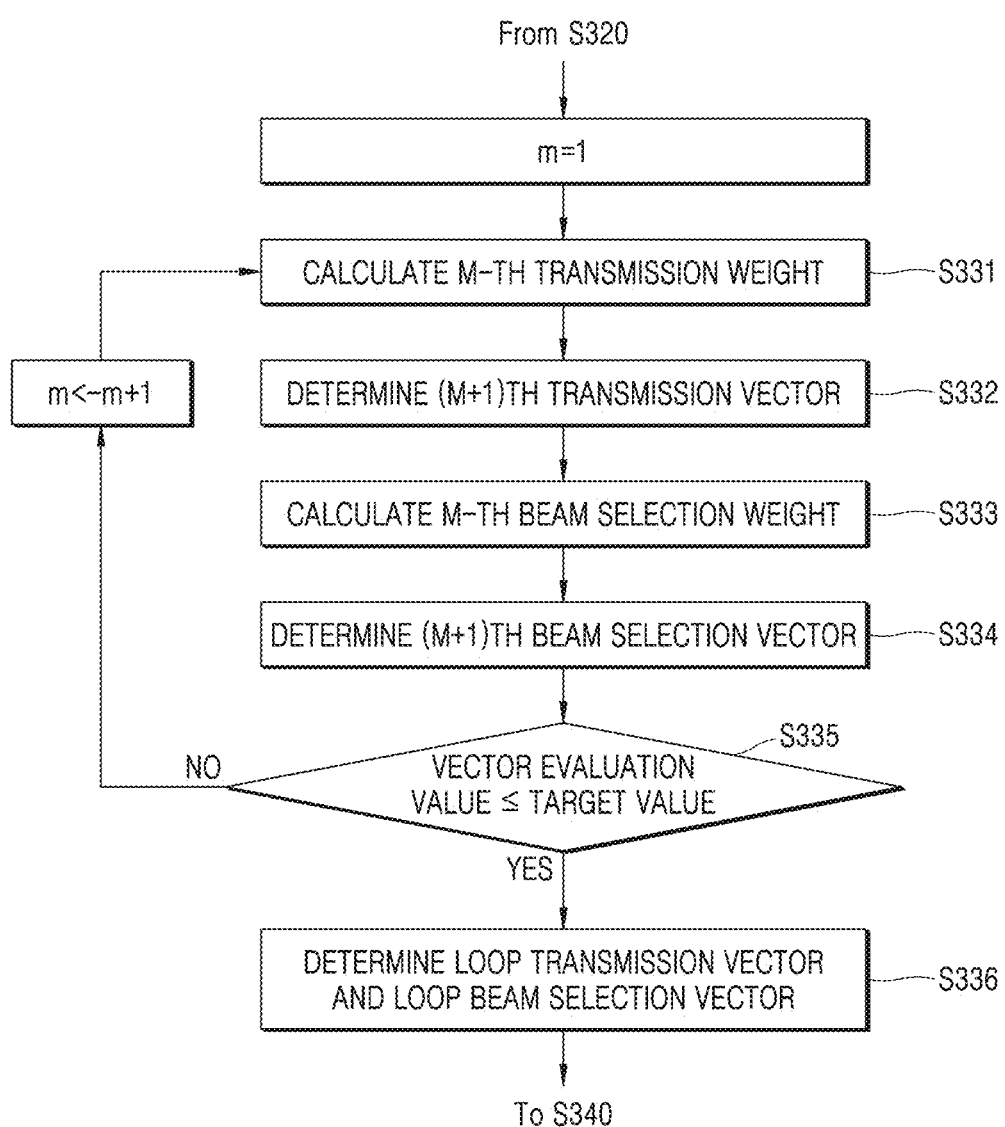
FIG. 6 is a flowchart of a method of determining a loop transmission vector and a loop beam selection vector, according to the example embodiments of FIG. 5.

FIG. 6 is a flowchart of a method of determining a loop transmission vector and a loop beam selection vector, according to the example embodiments of FIG. 5.

Referring to FIG. 6, the communication device 100 according to the inventive concepts may generate a transmission weight and a beam selection weight based on a transmission vector and a beam selection vector, determine, as a next transmission vector, a transmission vector having a minimum difference with respect to the transmission weight among candidate transmission vectors, and determine, as a next beam selection vector, a beam selection vector having a minimum difference with respect to the beam selection weight among candidate beam selection vectors.

In operation S331, the communication device 100 may calculate an m-th transmission weight based on an m-th (m is a natural number) transmission vector and an m-th beam selection vector. For example, the m-th transmission weight may be calculated according to Equation 20 and Equation 21 below.

$$w_x = x_{(m)} - (1/t_x)\nabla_x q_\rho(x_{(m)}, y_{(m)}), t_x = \gamma_x L_x \quad \text{[Equation 21]}$$

According to Equation 21, the m-th transmission weight may be determined based on a value obtained by partially differentiating an objective function of the m-th transmission vector and the m-th beam selection vector with respect to x.

In some example embodiments, the value obtained by performing partial differential with respect to x may be expressed according to Equation 22 below.

$$\nabla_x q_\rho(x_{(m)}, y_{(m)}) = \tilde{H}^H \tilde{H} x_{(m)} - \tilde{H}^H \phi \hat{\eta} + \rho(x_{(m)}, y_{(m)}) \quad \text{[Equation 22]}$$

In operation S332, the communication device 100 may determine an (m+1)th transmission vector based on the m-th transmission weight. For example, the communication device 100 may determine, as the (m+1)th transmission vector, a transmission vector having a minimum difference with respect to the m-th transmission weight among the candidate transmission vectors, as shown in Equation 23 below.

$$x_{(m+1)} \in P_\mathcal{X}(w_x) := \arg\min_x \{\|x_{(m)} - w_x\|^2 : x \in \mathcal{X}\} \quad \text{[Equation 23]}$$

The communication device 100 may design a Lagrangian function as shown in Equation 24 below to obtain the (m+1)th transmission vector corresponding to Equation 23.

$$\mathcal{L}(x, \lambda_1, \lambda_2) = (x - w_x)^H (x - w_x) + (\lambda_1)^T (\eta \tan \theta_\Omega - \text{Re}\{c_1 \phi^H \tilde{H} x\}) + (\lambda_2)^T (\eta \tan \theta_\Omega - \text{Re}\{c_2 \phi^H \tilde{H} x\}) \quad \text{[Equation 24]}$$

wherein $\lambda_i$ is a Lagrangian multiplier and may be expressed as a vector of $[\lambda_{i,1}, \ldots, \lambda_{i,K}]^T$, and $\eta$ may be expressed as a vector of $[\sqrt{\gamma_1}, \ldots, \sqrt{\gamma_K}]^T$. To solve Equation 23, the communication device 100 may obtain the transmission vector based on $\lambda_1$, $\lambda_2$ satisfying Equation 25 below.

$$\left. \frac{d\mathcal{L}(x, \lambda_1, \lambda_2)}{dx^H} \right|_{x=x^*} = 0 \quad \text{[Equation 25]}$$

$$\lambda_{1,k} \geq 0, \, f_{1,k}(x) \leq 0, \, \text{and} \, \lambda_{1,k} f_{1,k}(x) = 0, \, \forall k$$

$$\lambda_{2,k} \geq 0, \, f_{2,k}(x) \leq 0, \, \text{and} \, \lambda_{2,k} f_{2,k}(x) = 0, \, \forall k$$

The communication device 100 may obtain the transmission vector according to Equation 26 below based on Equation 25.

$$x^*(\lambda_1, \lambda_2) = \tfrac{1}{2} \tilde{H}^H \phi(c_2 \lambda_1 + c_1 \lambda_2) + w_x \quad \text{[Equation 26]}$$

wherein $\lambda_1$, $\lambda_2$ may allow all signals in the wireless communication terminal to be included in a constructive interference area. In some example embodiments, a plurality of wireless communication terminals may be divided into three sets according to a function value of Equation 16 in which the transmission vector is substituted, as shown in Equation 27.

$$\mathcal{C}_{i,i} = \{k | f_{i,k}(x) < 0\}$$

$$\mathcal{Z}_{i,i} = \{k | f_{i,k}(x) = 0\}$$

$$\mathcal{D}_{i,i} = \{k | f_{i,k}(x) > 0\} \quad \text{[Equation 27]}$$

$\mathcal{D}_{i,i}$, which is a condition in which destructive interference between users occurs with respect to an optimal Lagrangian multiplier $\{\lambda^*_{i,k}\}$, may be a null set. All wireless communication terminals included in $\mathcal{Z}_{i,i}$ may satisfy a condition of Equation 28 below.

$$\sqrt{\gamma_k} \tan \theta_\Omega - \text{Re}(c_1 \tilde{h}_k^H x^* e^{-j\phi_k}) = 0$$

$$\sqrt{\gamma_k} \tan \theta_\Omega - \text{Re}(c_2 \tilde{h}_k^H x^* e^{-j\phi_k}) = 0 \quad \text{[Equation 28]}$$

Accordingly, for all of the wireless communication terminals included in $\mathcal{Z}_{i,i}$, the transmission vector of Equation 26 may be substituted into Equation 28 so that a condition as shown in Equation 29 below may be obtained.

$$\begin{bmatrix} \eta_1 \\ \eta_2 \end{bmatrix} \tan \theta_\Omega = \text{Re}\left(\begin{bmatrix} c_1 \phi_1^H \tilde{H}_1 \{\tfrac{1}{2} \tilde{H}^H \phi(c_2 \lambda_1 + c_1 \lambda_2) + w_x\} \\ c_2 \phi_2^H \tilde{H}_2 \{\tfrac{1}{2} \tilde{H}^H \phi(c_2 \lambda_1 + c_1 \lambda_2) + w_x\} \end{bmatrix}\right) \quad \text{[Equation 29]}$$

In addition, in order to satisfy Equation 25, because the Lagrangian multiplier needs to have a value of 0 for all of the wireless communication terminals included in $\mathcal{C}_{i,i}$, a condition as shown in Equation 30 below may be obtained.

$$\begin{bmatrix} \eta_1 \\ \eta_2 \end{bmatrix} \tan \theta_\Omega = \quad \text{[Equation 30]}$$

$$\text{Re}\left(\begin{bmatrix} c_1 \phi_1^H \tilde{H}_1 w_x \\ c_2 \phi_2^H \tilde{H}_2 w_x \end{bmatrix} + \frac{1}{2} \begin{bmatrix} c_1 \phi_1^H \tilde{H}_1 \\ c_2 \phi_2^H \tilde{H}_2 \end{bmatrix} \begin{bmatrix} \tilde{H}_1^H \phi_1 c_2 & \tilde{H}_2^H \phi_2 c_1 \end{bmatrix} \begin{bmatrix} \lambda_1^* \\ \lambda_2^* \end{bmatrix}\right)$$

In order for all of the wireless communication terminals to be included in $\mathcal{C}^*_{i,i}$ and $\mathcal{Z}^*_{i,i}$, the Lagrangian multiplier may have a relationship as shown in Equation 31 below according to Equations 29 and 30.

$$\begin{bmatrix} \lambda_1^* \\ \lambda_2^* \end{bmatrix} = 2\left\{\text{Re}\left(\begin{bmatrix} c_1 \phi_1^H \tilde{H}_1 \\ c_2 \phi_2^H \tilde{H}_2 \end{bmatrix} \begin{bmatrix} \tilde{H}_1^H \phi_1 c_2; \tilde{H}_2^H \phi_2 c_1 \end{bmatrix}\right)\right\}^{-1} \quad \text{[Equation 31]}$$

$$\left\{\begin{bmatrix} \eta_1 \\ \eta_2 \end{bmatrix} \tan \theta_\Omega - \text{Re}\left(\begin{bmatrix} c_1 \varphi_1^H \tilde{H}_1 (\tilde{H}^H \phi \hat{\eta} + w_x) \\ c_2 \varphi_2^H \tilde{H}_2 (\tilde{H}^H \phi \hat{\eta} + w_x) \end{bmatrix}\right)\right\}$$

The communication device 100 may determine, as the (m+1)th transmission vector, a transmission vector having a minimum difference with respect to the m-th transmission weight among the plurality of transmission vectors based on the above conditions.

In operation S333, the communication device 100 may calculate an m-th beam selection weight based on the (m+1)th transmission vector and the m-th beam selection vector. For example, the m-th beam selection weight may be calculated according to Equation 20 and Equation 32 below.

$$w_y = y_{(m)} - \left(\frac{1}{t_y}\right) \nabla_y q_\rho(x_{(m+1)}, y_{(m)}), \, t_y = \gamma_y L_y \quad \text{[Equation 32]}$$

According to Equation 32, the m-th beam selection weight may be determined based on a value obtained by partially differentiating an objective function of the (m+1)th transmission vector and the m-th beam selection vector with respect to y. In some example embodiments, the value obtained by performing partial differential with respect to y may be expressed according to Equation 33 below.

$$\nabla_y q_\rho(x_{(m+1)}, y_{(m)}) = \rho(y_{(m)} - x_{(m+1)}) \quad \text{[Equation 33]}$$

In operation S334, the communication device 100 may determine, as an (m+1)th beam selection vector, a beam selection vector having a minimum difference with respect to the m-th beam selection weight among the candidate beam selection vectors. For example, the communication device 100 may determine, as the (m+1)th beam selection vector, a beam selection vector having a minimum difference with respect to the m-th beam selection weight among the candidate beam selection vectors, as shown in Equation 34 below.

$$y_{(m+1)} \in P_y(w_y) := \arg\min_y \{\|y_{(m)} - w_y\|^2 : y \in \mathcal{Y}\} \quad \text{[Equation 34]}$$

wherein a component corresponding to a beam selection index among the beam selection vectors may have a first value, and a component not corresponding to the beam selection index among the beam selection vectors may have a second value. For example, the second value may be equal to 0, and the first value may be determined according to Equation 35 below.

$$\hat{y}_i = \arg\min_{y_i} \{|y_i - w_{y,i}|^2 : 0 \le |y_i|^2 \le p_i\} \quad \text{[Equation 35]}$$

In addition, the communication device 100 may determine an index corresponding to the number of RF chain circuits as a beam selection index in a descending order among values according to Equation 36 below.

$$\{|w_{y,i}|^2 - |y_i - w_{y,i}|^2\}_{i=1}^M \quad \text{[Equation 36]}$$

In operation S335, the communication device 100 may generate a vector evaluation value based on the (m+1)th transmission vector and the (m+1)th beam selection vector and may compare the vector evaluation value with the target value. According to example embodiments of the inventive concepts, the vector evaluation value and the target value may be compared according to Equation 37 below.

$$\text{dist}(0, \partial \Psi_\rho^{(n)}(x_{(m+1)}^{(n)}, y_{(m+1)}^{(n)})) < \varepsilon^{(n)} \quad \text{[Equation 37]}$$

wherein n may be the number of loops iterated in the example embodiments of FIG. 5.

According to some example embodiments, the vector evaluation value and the target value may be compared according to Equation 38.

$$\max\left\{\frac{\|x_{(m+1)}^{(n)} - x_{(m)}^{(n)}\|_F}{\|x_{(m)}^{(n)}\|_F}, \frac{\|y_{(m+1)}^{(n)} - y_{(m)}^{(n)}\|_F}{\|y_{(m)}^{(n)}\|_F}\right\} \le \varepsilon_I \quad \text{[Equation 38]}$$

When the vector evaluation value is equal to or less than the target value, in operation S336, the communication device 100 may determine the loop transmission vector and the loop beam selection vector as the (m+1)th transmission vector and the (m+1)th beam selection vector, respectively.

Referring to FIGS. 5 and 6, in order to determine the target transmission vector and the target beam selection vector, the communication device 100 according to the inventive concepts may update the loop transmission vector and the loop beam selection vector a designated number of times or more. In order to update the loop transmission vector and the loop beam selection vector the designated number of times or more, the communication device 100 may need to determine a plurality of transmission vectors and a plurality of beam selection vectors. That is, the communication device 100 may perform two iteration operations, and the iteration operation according to FIG. 5 may be referred to as an outer-loop iteration operation, and the iteration operation according to FIG. 6 may be referred to as an inner-loop iteration operation. For example, when the communication device 100 performs n outer-loop iteration operations to generate the target transmission vector and the target beam selection vector, and when m inner-loop iteration operations are performed, the communication device 100 needs to perform a total of n x m iteration operations.

According to some example embodiments, the communication device 100 according to the inventive concepts may not be limited to performing the outer-loop iteration operation by the designated number of times according to the example embodiments of FIG. 5, but may perform the outer-loop iteration operation until Equation 39 below is satisfied.

$$\frac{\|x^{(n)} - y^{(n)}\|_F}{\max\left(\|x^{(n)}\|_F, \|y^{(n)}\|_F\right)} \le \varepsilon_O \quad \text{[Equation 39]}$$

Figure 7B:
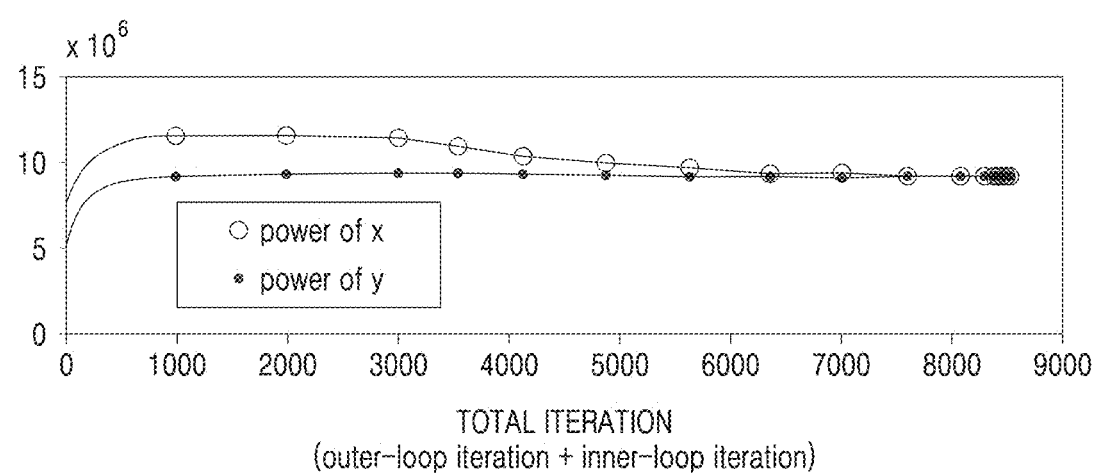
FIG. 7B is a graph of strengths of a transmission vector and a beam selection vector generated according to FIGS. 5 and 6.

FIG. 7A is a graph of a difference between a loop transmission vector and a loop beam selection vector generated according to FIG. 5 with respect to the number of iterations, and FIG. 7B is a graph of strengths of a transmission vector and a beam selection vector generated according to FIGS. 5 and 6.

Referring to FIG. 7A, the communication device 100 may update the loop transmission vector and the loop beam selection vector so that a difference between the loop transmission vector and the loop beam selection vector gradually decreases as the number of iterations of an outer loop according to FIG. 5 increases. For example, the communication device 100 may increase a penalty weight each time the number of iterations of the outer loop increases in Equation 19, so that a ratio of a portion corresponding to a difference between the loop transmission vector and the loop beam selection vector in Equation 19 may increase.

Referring to FIG. 7B, the communication device 100 may determine a target transmission vector and a target beam selection vector by performing an iteration operation on the entire outer loop and inner loop according to FIGS. 5 and 6. It may be verified that the difference between the target transmission vector and the target beam selection vector gradually decreases as the iteration operation is performed.

Figure 8:
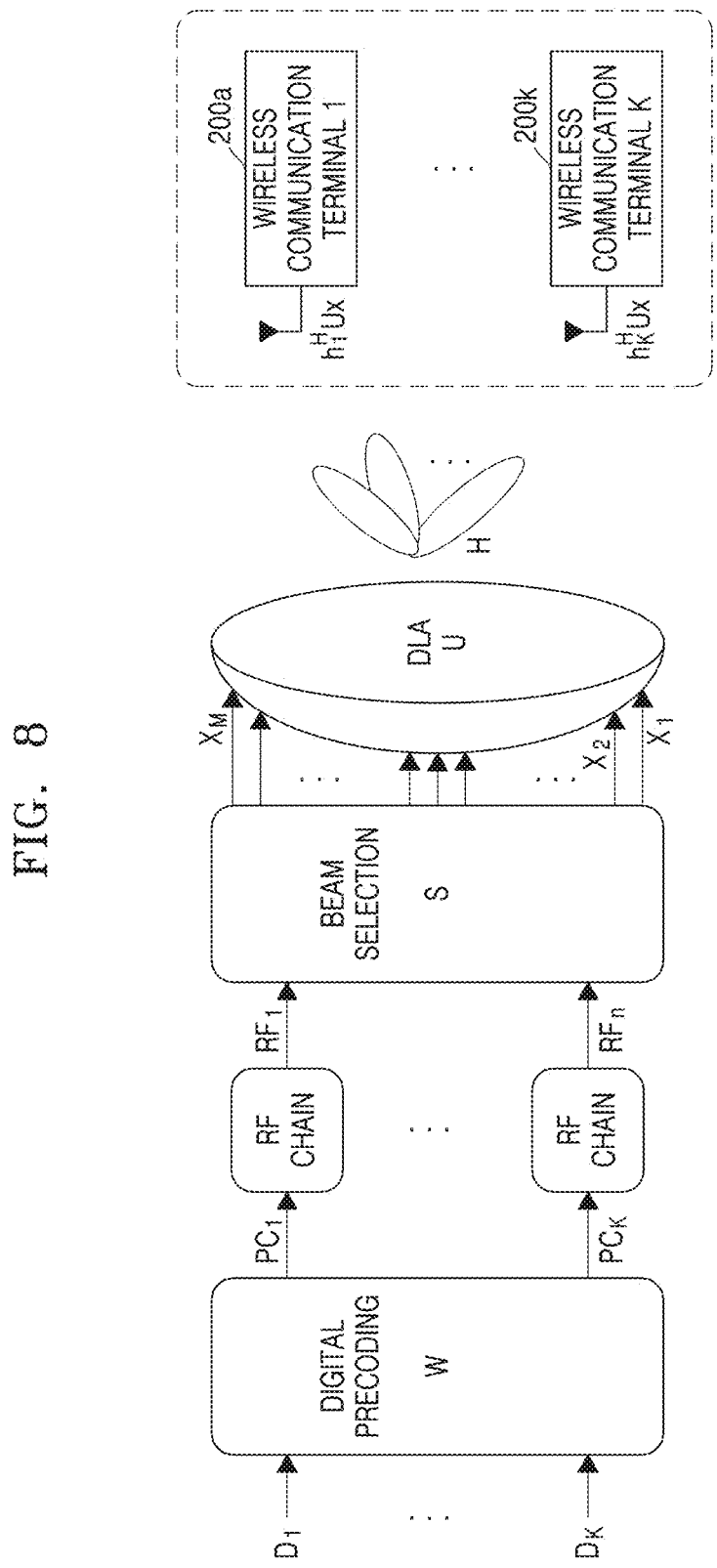
FIG. 8 is a flowchart of a method in which a communication device generates a transmission signal, according to example embodiments of the inventive concepts.
Figure 9:
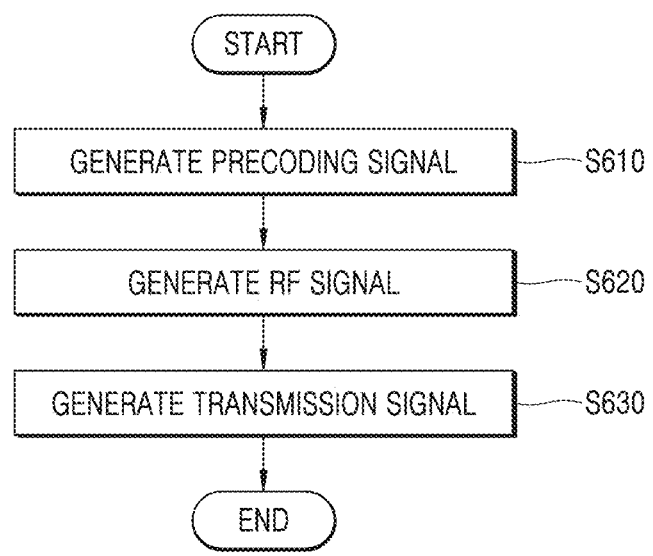
FIG. 9 is a diagram of a method of generating a transmission signal by generating a precoding signal and a radio frequency (RF) signal, according to example embodiments of the inventive concepts.

FIG. 8 is a flowchart of a method in which the communication device 100 generates a transmission signal, according to example embodiments of the inventive concepts, and FIG. 9 is a diagram of a method of generating a transmission signal by generating a precoding signal and an RF signal, according to example embodiments of the inventive concepts.

The communication device 100 according to the inventive concepts may obtain the target transmission vector and the target beam selection vector by performing the operations of FIGS. 4 to 6, and may determine a beam selection matrix S based on the target beam selection vector. The communication device 100 having determined the beam selection matrix S may generate a precoding matrix W by performing inverse calculation from the target transmission vector according to Equation 40 below.

$$W = S^T x d^H \text{ where } x = SWd \quad \text{[Equation 40]}$$

Referring to FIG. 8, the precoding matrix W thus generated may be a matrix including $N_{RF}$ rows and K columns. In some example embodiments, $N_{RF}$ may be the number of RF chain circuits, and K may be the number of a plurality of wireless communication terminals. In operation S610, the communication device 100 may receive pieces of data $D_1$ to $D_K$ corresponding to the plurality of wireless communication terminals in a matrix including K rows and one column, and may generate precoding signals $PC_1$ to $PC_K$ including $N_{RF}$ rows and one column by performing a matrix multiplication operation with the precoding matrix W.

In operation S620, the $N_{RF}$ RF chain circuits of the communication device 100 may receive the precoding signals $PC_1$ to $PC_K$ and output amplified RF signals $RF_1$ to $RF_n$. The beam selection matrix S of the communication device 100 may be including M rows and $N_{RF}$ columns, and may output the RF signals $RF_1$ to $RF_n$ including $N_{RF}$ rows as selection signals $X_1$ to $X_M$ having M rows and one column through a matrix multiplication operation. In some example embodiments, the output selection signals $X_1$ to $X_M$ may be signals in which $N_{RF}$ antennas corresponding to the RF signals $RF_1$ to $RF_n$ are selected from among M antennas.

In operation S630, a beamforming matrix U corresponding to a DLA may be a matrix including M rows and M columns, and a channel matrix H may be a matrix including K rows and M columns. Accordingly, the communication device 100 may output transmission signals corresponding to K wireless communication terminals. The transmission signal generated when the communication device 100 receives data may be expressed by Equation 41 below.

$$y = HUSWd + n \quad \text{[Equation 41]}$$

wherein a transmission signal received by each wireless communication terminal may be represented by $h_k^H U x$.

Figure 10A:
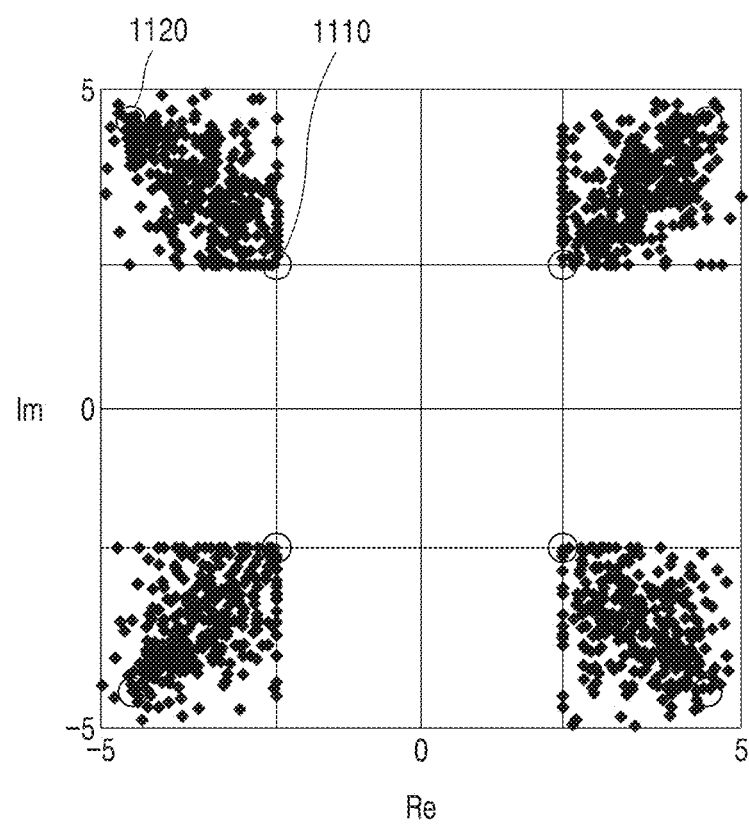
FIG. 10A is a complex plane of the phase of a transmission signal generated via a quadrature phase shift keying (QPSK) method, according to example embodiments of the inventive concepts.
Figure 10B:
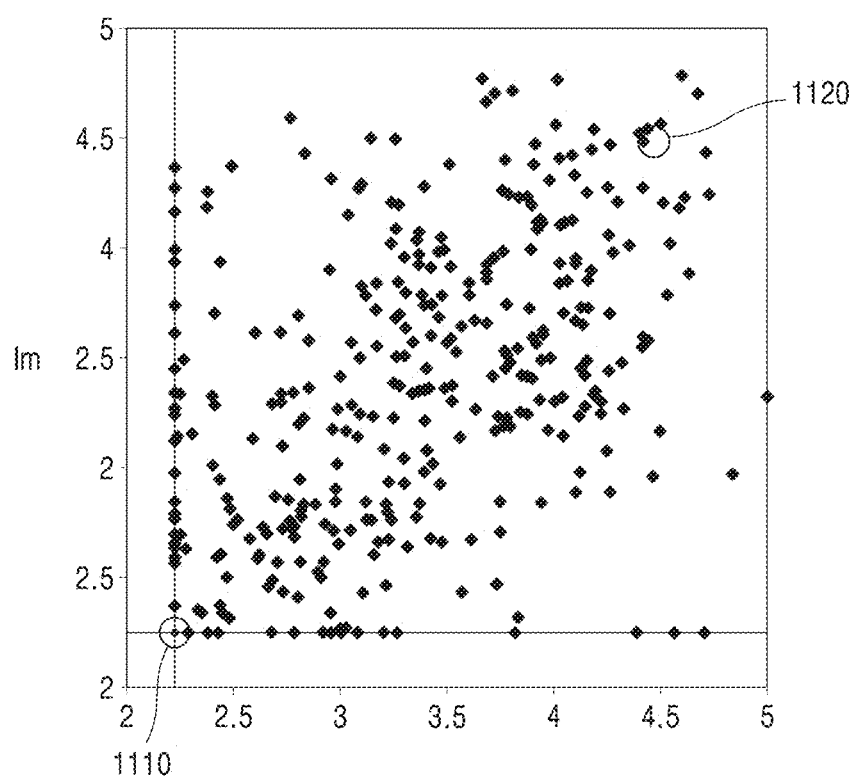
FIG. 10B is a complex plane of an area restriction condition for a terminal and the phase of a generated transmission signal.

FIG. 10A is a complex plane of the phase of a transmission signal generated via a QPSK method, according to example embodiments of the inventive concepts, and FIG. 10B is a complex plane of an area restriction condition for a terminal and the phase of a generated transmission signal.

The communication device 100 of the inventive concepts may output transmission signals to four wireless communication terminals, and referring to FIG. 10A, each transmission signal may satisfy an area restriction condition on a complex plane. A transmission signal corresponding to each wireless communication terminal may be formed within a certain phase range based on a phase of a first target point 1110, and a magnitude of the transmission signal may be greater than that of the first target point 1110 due to constructive interference caused by other wireless communication terminals. In some example embodiments, the first target point 1110 may be a point of a portion of a transmission signal generated by a channel vector corresponding to each wireless communication terminal, and the entire transmission signal may be a transmission signal in which interference occurs by multiplying the channel vector corresponding to each wireless communication terminal by a selection signal corresponding to another wireless communication terminal.

The communication device 100 may perform an outer-loop iteration operation and an inner-loop iteration operation described with reference to FIGS. 4 to 6 on each wireless communication terminal so that each transmission signal corresponding to each wireless communication terminal generated by a beamforming matrix and a channel matrix may be included in the area restriction condition. Accordingly, the communication device 100 performing a communication operation via the QPSK method may determine a beam selection matrix and a precoding matrix so that transmission signals may be included in an area on a complex plane corresponding to each wireless communication terminal. Further, referring to FIG. 10B, a transmission signal including an interference component may have a magnitude greater than that of the first target point 1110 and may have a size and a phase close to those of a second target point 1120. The second target point 1120 may be a location on a complex plane where the communication device 100 is to generate the transmission signal including the interference component.

One or more of the elements disclosed above may include or be implemented in one or more processors such as hardware including logic circuits; a hardware/software combination such as a processor executing software; or a combination thereof. For example, the processors more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An operating method of a communication device for providing a beamformed transmission signal to a plurality of terminals, the operating method comprising:
    determining a target transmission vector based on an area restriction condition, the area restriction condition being defined such that a strength of the beamformed transmission signal with respect to each of the plurality of terminals is amplified based on constructive interference generated from other terminals among the plurality of terminals;
    generating a beam selection matrix for selecting a portion of antennas from among a plurality of antennas based on the target transmission vector and a beam selection condition;
    generating a precoding matrix based on the target transmission vector and the beam selection matrix; and
    generating the beamformed transmission signal based on the beam selection matrix and the precoding matrix.

2. The operating method of claim 1, further comprising:
    obtaining terminal channel information about the plurality of terminals; and
    determining a beamforming matrix and a channel matrix based on the terminal channel information.

3. The operating method of claim 1, wherein the determining of the target transmission vector comprises determining, as the target transmission vector, a candidate transmission vector having a minimum difference between a location on a complex plane of a transmission signal generated based on a candidate transmission vector among candidate transmission vectors according to the area restriction condition and a location of a target point on a complex plane corresponding to each of the plurality of terminals.

4. The operating method of claim 1, wherein the determining of the target transmission vector comprises:
    calculating a first transmission weight based on a first candidate transmission vector among candidate transmission vectors according to the area restriction condition and a first candidate beam selection vector among candidate beam selection vectors according to the beam selection condition; and
    determining, as a second candidate transmission vector, a candidate transmission vector having a minimum difference with respect to the first transmission weight among the candidate transmission vectors.

5. The operating method of claim 4, wherein the determining of the target transmission vector further comprises:
calculating a first beam selection weight based on the second candidate transmission vector and the first candidate beam selection vector; and
determining, as a second candidate beam selection vector, a candidate beam selection vector having a minimum difference with respect to the first beam selection weight among the candidate beam selection vectors.

6. The operating method of claim 5, wherein the determining of the target transmission vector further comprises, when a vector evaluation value generated based on the second candidate transmission vector and the second candidate beam selection vector is less than or equal to a threshold value, determining the second candidate transmission vector as a loop transmission vector and determining the second candidate beam selection vector as a loop beam selection vector.

7. The operating method of claim 6, wherein the vector evaluation value is calculated based on a weight parameter and a difference between the loop transmission vector and the loop beam selection vector.

8. The operating method of claim 7, wherein the determining of the target transmission vector further comprises, by increasing the weight parameter and generating the vector evaluation value, generating the target transmission vector and a target beam selection vector based on the loop transmission vector and the loop beam selection vector.

9. The operating method of claim 1, wherein the beam selection matrix is a matrix for selecting, as the portion of antennas, antennas activated by a radio frequency (RF) chain circuit from among the plurality of antennas.

10. The operating method of claim 9, wherein the generating of the beam selection matrix comprises determining elements in a row of a matrix corresponding to the RF chain circuit based on a beam selection weight.

11. The operating method of claim 10, wherein, in the beam selection matrix, a sum of elements in each row corresponding to the RF chain circuit is equal to a first value, and a sum of elements in remaining rows is equal to a second value.

12. The operating method of claim 11, wherein elements of a row corresponding to the RF chain circuit have a value having a minimum difference with respect to the beam selection weight.

13. The operating method of claim 1, wherein the beamformed transmission signal is generated in a unit of a data symbol of the communication device based on the beam selection matrix and the precoding matrix.

14. An operating method of a communication device for providing a beamformed transmission signal to a plurality of terminals, the operating method comprising:
generating a precoding signal by precoding transmission data corresponding to each of the plurality of terminals based on a precoding matrix; and
based on a beam selection matrix for selecting a portion of antennas from among a plurality of antennas, generating a transmission signal corresponding to each of the portion of antennas,
wherein
the transmission signal corresponding to each target terminal is constructively interfered by an interference vector corresponding to another terminal in a transmission signal component and has an amplified strength, and
the transmission signal includes a target terminal vector, which is a transmission signal component corresponding to the target terminal, and the interference vector, and a signal of the target terminal vector is constructively interfered by the interference vector.

15. The operating method of claim 14, wherein the precoding signal includes a set of vectors corresponding to a number of activated radio frequency (RF) chains.

16. The operating method of claim 14, wherein the generating of the transmission signal comprises allocating transmission signals corresponding to the portion of antennas to the precoding signal based on the beam selection matrix.

17. The operating method of claim 14, wherein the generating of the transmission signal comprises:
selecting selection signals corresponding to the portion of antennas based on the beam selection matrix; and
generating the transmission signal based on the selection signals, a beamforming matrix, and a channel matrix according to a channel state of each terminal.

18. A communication device comprising:
a plurality of antennas each configured to output a beamformed transmission signal to a plurality of terminals;
a radio frequency (RF) chain arranged in a number less than a number of the plurality of antennas; and
a processor configured to determine a beam selection matrix and a precoding matrix based on an area restriction condition and a beam selection condition for each of the plurality of terminals, the area restriction condition being defined such that a strength of a transmission signal with respect to each of the plurality of terminals is amplified based on constructive interference generated from another terminal among the plurality of terminals,
wherein the transmission signal is generated by the beam selection matrix and the precoding matrix, the strength of the transmission signal being amplified based on the constructive interference by an interference vector corresponding to the other terminal.

19. The communication device of claim 18, wherein the plurality of antennas are each configured to obtain terminal channel information about the plurality of terminals, and
the processor is further configured to determine a beamforming matrix and a channel matrix based on the terminal channel information.

* * * * *